No. 735,366. Patented August 4, 1903.

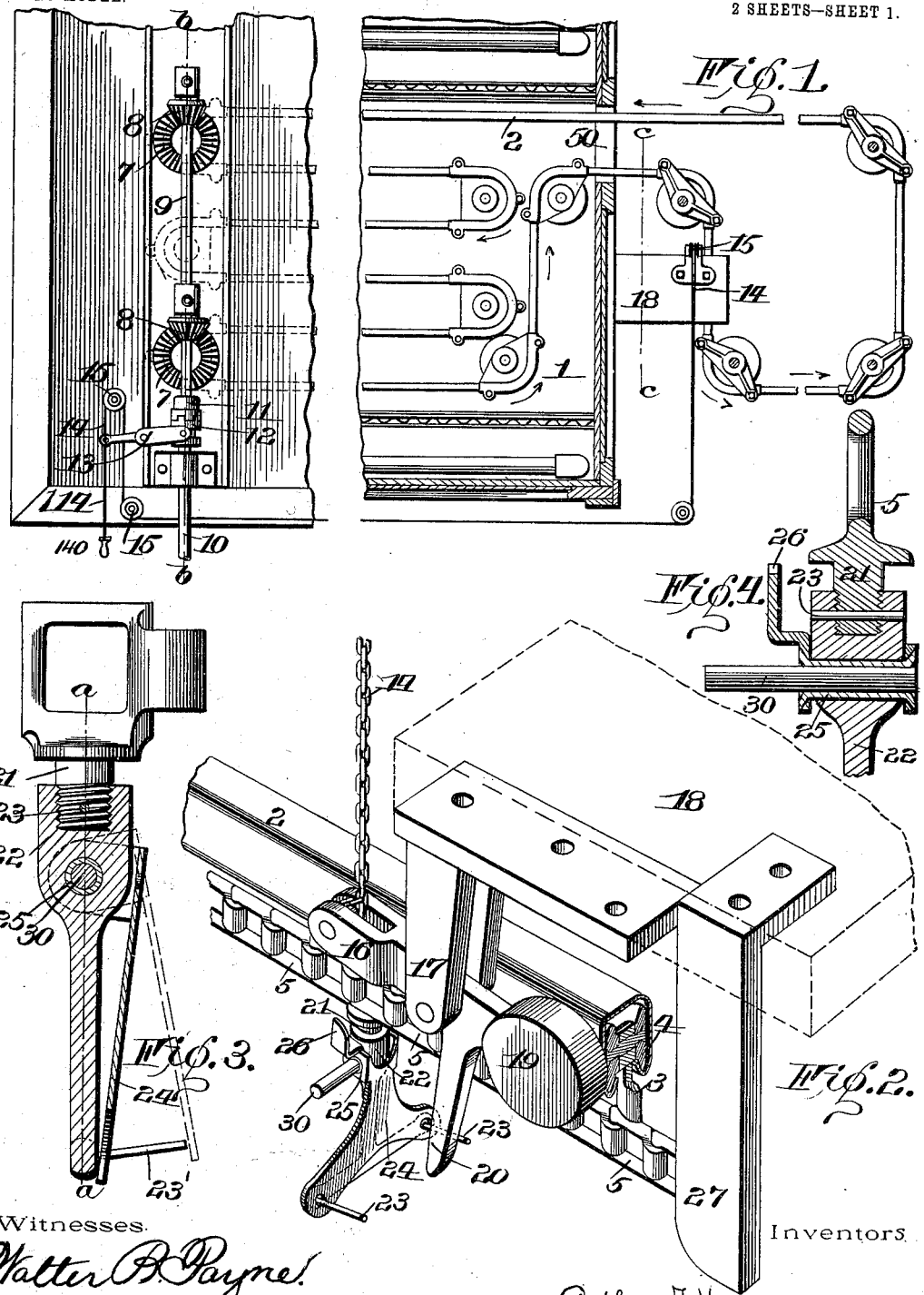

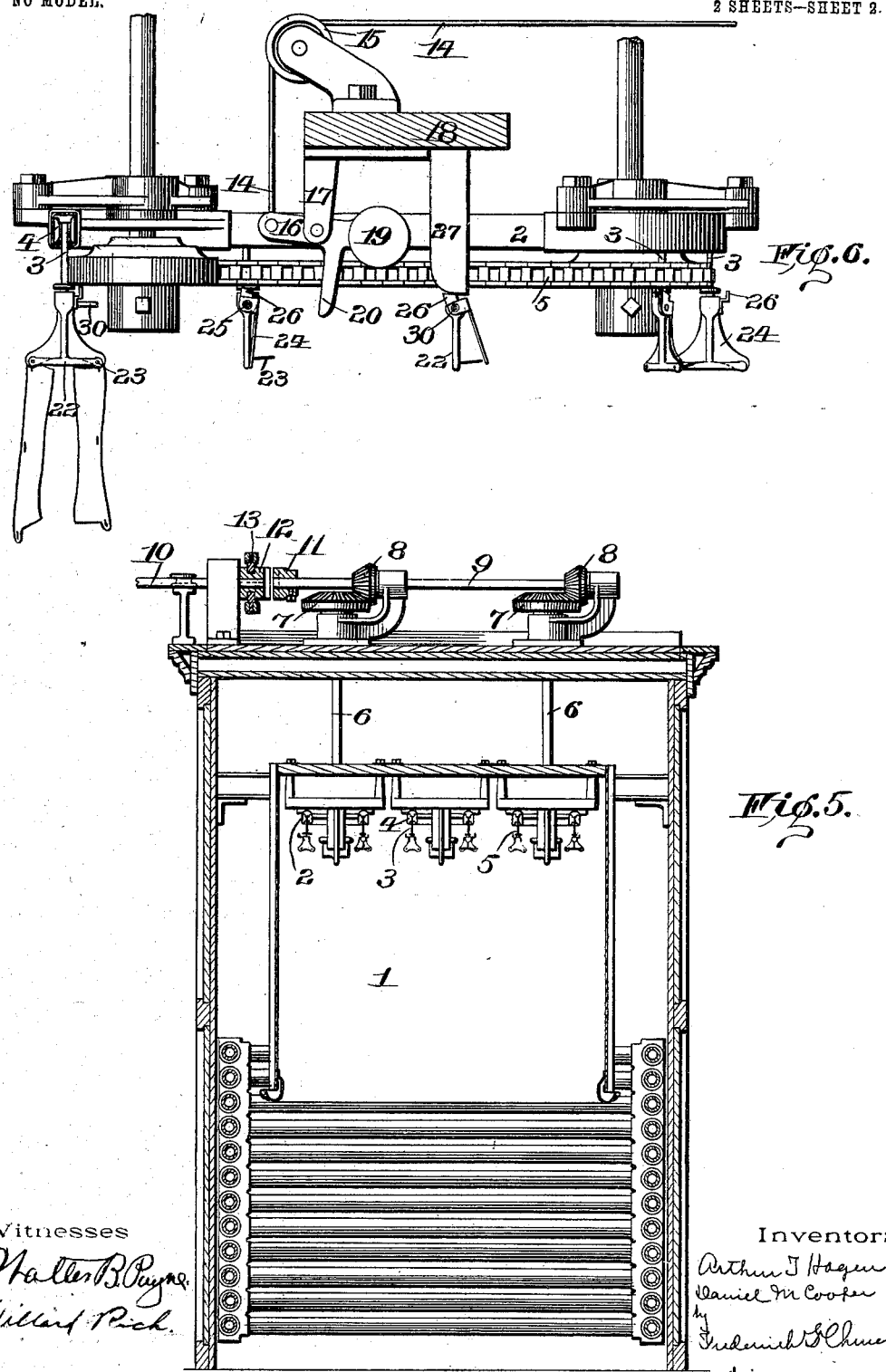

UNITED STATES PATENT OFFICE.

ARTHUR T. HAGEN AND DANIEL M. COOPER, OF ROCHESTER, NEW YORK, ASSIGNORS TO THE A. T. HAGEN COMPANY, OF ROCHESTER, NEW YORK, A CORPORATION OF NEW YORK.

DRIER.

SPECIFICATION forming part of Letters Patent No. 735,366, dated August 4, 1903.

Application filed January 13, 1902. Serial No. 89,521. (No model.)

*To all whom it may concern:*

Be it known that we, ARTHUR T. HAGEN and DANIEL M. COOPER, of Rochester, county of Monroe, and State of New York, have invented certain new and useful Improvements in Driers; and we do hereby declare the following to be a full, clear, and exact description of the same, reference being had to the accompanying drawings, forming a part of this specification, and to the figures of reference marked thereon.

Our present invention has for its object to provide a drier of the endless-conveyer type particularly adapted for carrying small articles to be dried—such as articles of wearing-apparel, collars, cuffs, &c.—into and through the drying room or apartment, the air in which is heated by steam or otherwise, and automatically removing the articles from the conveying mechanism, preferably on the outside of the chamber or room; and the invention relates particularly to mechanism for conveying the articles and removing them from the conveyer, and, further, in the provisions made for arresting the operation of the conveyer when desired.

The invention further consists in certain improvements hereinafter described, the novel features being pointed out particularly in the claims at the end of the specification.

In the accompanying drawings, Figure 1 is a plan view, partially in section, of the portion of a drier embodying our improvements. Fig. 2 is a perspective view of a portion of the conveyer, showing the clutch-operating mechanism and the holder or hanger for the articles being dried. Fig. 3 is a vertical longitudinal section of one of the carriers, showing the doffer; Fig. 4, a sectional view on the line *a a* of Fig. 3; Fig. 5, a section on the line *b b* of Fig. 1; Fig. 6, a similar view on the line *c c* of Fig. 1.

Similar reference-numerals in the several figures indicate similar parts.

Referring particularly to Figs. 1 and 6, 1 is a drying room or apartment of any suitable dimensions and heated by any suitable means, such as steam-coils, the air therein being caused to circulate, if desired, by a fan or blower of any suitable construction. Arranged within this chamber 1 is a suitable track 2, preferably tubular in form and having a slot at the bottom for the passage of shanks or projections 3, having at their upper ends rollers 4, operating on the lower horizontally-extending flanges of the track 2, as shown particularly in Fig. 2, the lower ends of the shanks or projections 3 being attached at intervals to an endless conveyer or sprocket-chain 5, supported below the track by said shanks, and said conveyer or chain extends around guide-wheels arranged at the bends, angles, or curves of the track and below the same for the purpose of guiding the conveyer in its passage into, through, and externally of the drying-chamber. The drying-chamber is provided with the aperture 50, into and out of which the conveyer passes for carrying the articles to be dried into and from the chamber, and some of the guide-wheels for the conveyer and portions of the track are supported outside of the chamber, so that the articles carried by the conveyer may be applied to and removed from the latter at the exterior. The conveyer may consist of an ordinary sprocket-chain driven at one or more points, if desired, by power applied to the sprocket-wheels engaging it, and in the present instance we have provided two wheels located at the ends of the conveyer-loops in the chamber and attached to vertically-extending shafts 6, having at their upper ends beveled gears 7, with which mesh corresponding pinions 8, secured to a horizontally-extending shaft 9, arranged above the chamber, as shown in Figs. 1 and 5. The shaft 9 is adapted to be driven by a continuously-rotating driving-shaft 10 through a suitable clutch connection, that shown in the present instance embodying a section 11, secured to the shaft 9, and a movable section 12, operated by a suitable shifting lever 13, the free end of which is attached to a cord or chain 14, extending around suitable guide-pulleys 15 and attached to one end of a lever 16, pivoted to a bracket 17 on an extension or support 18. The lever 16 is provided at one end with a counterweight 19 and with a downwardly-extending arm 20, arranged in proximity to the conveyer outside of the drying-chamber and adapted to be engaged by a suitable projection on the conveyer for the purpose of operating the lever and disconnecting the clutch when desired.

For the purpose of actuating the clutch-sections into engagement the end of the chain 14 may be extended beyond the lever 13, as indicated at 114, Fig. 1, and provided with any suitable operating-handle 140, by means of which the lever 13 may be moved in the opposite direction from that in which it is operated by the lever 16.

As stated, the conveyer may consist of an ordinary sprocket-chain, the links of which are connected in the usual manner, and at suitable intervals some of these links are provided with downwardly-extending shanks 21, preferably threaded, as shown in Figs. 3 and 4, and carrying at their lower ends arms or carriers 22, screwing upon the threaded portions of the shanks and secured from turning by suitable means, such as a pin 23'. The lower ends of the carriers 22 are extended laterally of the conveyer and are provided with pins or projections 23, curved or inclined at a slight angle from the horizontal and extending in planes substantially parallel with the conveyer for the purpose of supporting the articles to be dried.

24 indicates a stripper pivoted upon the carrier 22, preferably near its upper portion and having at its lower end perforations through which the supporting-pins 23 extend, said strippers in the present instance being formed of a single plate of metal having perforated ears at its upper portion forming journals and in the present construction hanging loosely upon a sleeve 25, passing laterally through the carrier 22. The strippers are provided above their pivotal points with arms or extensions 26, formed integrally with a plate and adapted to be engaged by a stationary arm or projection 27, secured to the support 18, arranged in the path of the projections 26 and at one side of the conveyer.

The projection or projections upon the conveyer for operating the clutch-controlling lever 16 may be of suitable construction and capable of application to the conveyer at different points, and in the present instance these are in the form of removable stops or pins 30, adapted to be inserted in suitable recesses, preferably in the thimbles or sleeves 25 on the carriers, and to extend laterally from the conveyer a suitable distance to engage said lever when desired. It will be understood that the carriers 22 are arranged reasonably near together upon the conveyer, the space between them depending somewhat upon the character of the articles to be carried through the drier, as, if small articles, such as collars and cuffs, the space between the arms will be small, as shown; but if larger articles are to be dried they may be separated a greater distance.

In using the apparatus the conveyer is driven continuously in the direction of the arrow shown in Fig. 1, the driving mechanism controlled by the controlling-lever 16 being in the position shown in Fig. 2. The articles to be dried, such as collars or cuffs, are hung upon the pins 23 of the carriers at some convenient point outside of the chamber, and they are then carried by the conveyer into the drying-chamber through the aperture 50 and back and forth therein any desired number of times and finally pass out of the aperture 50 to the exterior. As the carriers 22 pass beneath the projection or arm 27 the upper ends 26 of the strippers will be engaged thereby and the strippers tilted to the position shown in dotted lines in Fig. 3, stripping the articles from the supporting-pins 23 and allowing them to drop into a suitable receptacle placed beneath. When it is desired to arrest the operation of the conveyer—as, for instance, when one carrier has made a complete circuit of the drying-chamber—the pin 30 is inserted in the recess in the carrier which is to be arrested, and when this pin engages the arm 20 of the lever 16 the latter will be tilted and, drawing upon the flexible connection 14, will operate the movable clutch-section and disconnect the driving mechanism. By providing means whereby the driving mechanism can be disconnected from the conveyer when any of the supports reach a predetermined position the operators applying the articles may cause the stoppage of the mechanism as often as desired during its passage through the drying-chamber in order to permit the separate lots of articles to be deposited in different receptacles arranged beneath the stripper-operating cam, a change of receptacles being effected during the stoppage of the conveyer.

We find in practice that by arranging a separate positively-actuated stripper upon each of the supports attached to the conveyer, each stripper moving in close proximity to the supporting-pins 23, the articles will be positively removed and cannot become fastened to the pins by the drying starch.

We claim as our invention—

1. The combination with a track, a conveyer traveling on the track and the carrying-pin thereon, of a stripper on the conveyer movable longitudinally of the carrying-pin.

2. The combination with a traveling conveyer and the carrying-pin thereon, of a stripper on the conveyer movable longitudinally of the pin and stationary means for engaging and operating the stripper.

3. The combination with a traveling conveyer and the carrying-pin thereon extending longitudinally of the conveyer, of a stripper on the conveyer movable longitudinally of the pin for removing articles therefrom and a stationary projection for engaging and moving the stripper.

4. The combination with a traveling conveyer and the carrying-pin thereon, of a stripper on the conveyer movable longitudinally of the pins and having the aperture for the passage of the pin.

5. The combination with a traveling conveyer and the carrying-pins thereon extending longitudinally of the conveyer, of the stripper-plate pivoted on the carrier and having apertures through which the carrying-pins extend.

6. The combination with a track, a conveyer traveling thereon having a plurality of carrying devices, a driving mechanism and controlling devices for the driving mechanism, of stop devices adjustable on the conveyer for coöperating with the controlling devices to arrest the movement of the conveyer when desired.

7. The combination with a traveling conveyer having a plurality of carriers thereon, strippers for the carriers and means for operating the strippers, of a driving mechanism for the conveyer, means for controlling the latter and adjustable stops on the carriers adapted to coöperate with the controlling means.

8. The combination with the traveling conveyer having the holding-pins thereon extending longitudinally of the conveyer, of the stripper-plate pivoted on the conveyer having the apertures for the pins on one side of the pivot and the arm on the opposite side and a stationary projection for engaging the arm to operate the stripper on its pivot.

9. The combination with the track, the conveyer and supports thereon operating on the track, the carriers on the conveyer, strippers on the carrier and means for actuating the strippers to positively remove articles from the carriers at predetermined points.

10. The combination with the track, the conveyer and supports on the latter operating on the track and a plurality of carriers on the conveyer, of driving devices for the conveyer, stationary means for controlling said driving devices and means adjustable on the carriers engaging said means for controlling the driving devices by the movement of the conveyer on the track.

11. The combination with the conveyer and the carriers thereon, of the strippers pivoted on the carriers each having its arm and a stationary projection for engaging the arms of the strippers.

12. The combination with a traveling conveyer, a carrier thereon, of a stripper on the conveyer movable longitudinally of the carrier.

13. The combination with a traveling conveyer, a carrier thereon, a stripper on the conveyer movable longitudinally of the carrier, of a driving mechanism for the conveyer, means for controlling it and a stop on the carrier adapted to coöperate with the controlling means.

ARTHUR T. HAGEN.
DANIEL M. COOPER.

Witnesses:
G. WILLARD RICH,
GEO. H. DAY.